(12) United States Patent
Huang

(10) Patent No.: US 12,467,919 B2
(45) Date of Patent: Nov. 11, 2025

(54) TEST STICK, TESTING METHOD AND APPLICATION

(71) Applicant: GUANGDONG SEINDA BIOMEDICAL CORPORATION, Guangdong (CN)

(72) Inventor: Jing-Feng Huang, Guangdong (CN)

(73) Assignee: GUANGDONG SEINDA BIOMEDICAL CORPORATION, Guangzhou (CN)

( * ) Notice: Subject to any disclaimer, the term of this patent is extended or adjusted under 35 U.S.C. 154(b) by 969 days.

(21) Appl. No.: 17/627,614

(22) PCT Filed: Jul. 15, 2020

(86) PCT No.: PCT/CN2020/101988
§ 371 (c)(1),
(2) Date: Jan. 14, 2022

(87) PCT Pub. No.: WO2021/012999
PCT Pub. Date: Jan. 28, 2021

(65) Prior Publication Data
US 2022/0276230 A1    Sep. 1, 2022

(30) Foreign Application Priority Data
Jul. 19, 2019  (CN) .......................... 201910657081.5

(51) Int. Cl.
*G01N 33/533* (2006.01)
*B01L 3/00* (2006.01)
*G01N 33/543* (2006.01)

(52) U.S. Cl.
CPC .......... *G01N 33/533* (2013.01); *B01L 3/5023* (2013.01); *G01N 33/54388* (2021.08); *B01L 2300/0825* (2013.01)

(58) Field of Classification Search
CPC ................. G01N 33/53; G01N 33/533; G01N 33/54388; G01N 33/5302; G01N 33/543;
(Continued)

(56) References Cited

U.S. PATENT DOCUMENTS 8,003,407 B2 *   8/2011  Zhou ................ G01N 33/54388
                                                    436/514
2019/0079085 A1  3/2019  Lawrence et al.
(Continued)

FOREIGN PATENT DOCUMENTS

CN       202453356 U    9/2012
CN       103439519 A   12/2013
(Continued)

OTHER PUBLICATIONS

International Search Report and Written Opinion, dated Sep. 29, 2020, for International Application No. PCT/CN2020/101988. (w/ English Translation of the International Search Report) (12 pages).
(Continued)

*Primary Examiner* — Maureen Wallenhorst
(74) *Attorney, Agent, or Firm* — Seed IP Law Group LLP

(57) ABSTRACT

A test stick, a testing method and application. A top cover and a bottom cover are engaged by means of positioning holes (D01) and positioning posts (G01) so as to fix a test strip; clamp slot structures (D02, D06) and a bulge stage (D04) are provided inside the bottom cover; each of the clamp slot structures (D02, D06) is internally provided with a support bulge (D03), with the height of the support bulge (D03) being less than or equal to the height of the bulge stage (D04); the top cover is provided with fixing plates (G02, G03, G04, G06), a reaction window (G05), a sample loading hole (A) and a testing liquid hole (B); and after the top cover and the bottom cover are engaged by means of the positioning holes (D01) and the positioning posts (G01),
(Continued)

under the pressing of the fixing plates (G02, G03, G04, G06) and the testing liquid hole (B) of the top cover, the middle of the test strip bulges upward to form an "arch-bridge" structure with a horizontal plane. With such an "arch-bridge" structure, the flow direction of a testing liquid on the test strip and the speed of chromatography are controlled so as to improve the accuracy and precision of the testing result of the test stick to achieve the purpose of accurately testing a small amount of sample.

18 Claims, 8 Drawing Sheets

(58) Field of Classification Search
CPC ............ G01N 33/558; G01N 33/54346; B01L 3/5023; B01L 2300/0825; B01L 2300/161; B01L 2200/025; B01L 2400/0406; Y10T 436/2575
USPC ......... 436/514, 518, 531, 63, 161, 162, 164, 436/165, 169, 170, 180; 422/420, 421, 422/424, 69; 435/7.1
See application file for complete search history.

(56) References Cited

U.S. PATENT DOCUMENTS

2020/0355679 A1* 11/2020 Azuma ............ G01N 33/54388
2024/0426817 A1* 12/2024 Lei ..................... G01N 27/3272

FOREIGN PATENT DOCUMENTS

| CN | 205263096 U | 5/2016 |
| CN | 205353093 U | 6/2016 |
| CN | 207248895 U | 4/2018 |
| CN | 207730676 U | 8/2018 |
| CN | 208833775 U | 5/2019 |
| CN | 110361529 A | 10/2019 |
| CN | 210243664 * | 4/2020 |
| CN | 210243664 U | 4/2020 |
| JP | S63501074 A | 4/1988 |
| JP | 10-132820 A | 5/1998 |
| JP | 2002542485 A | 12/2002 |
| JP | 2015502805 A | 1/2015 |
| JP | 2017508154 A | 3/2017 |
| JP | 2019109090 A | 7/2019 |
| KR | 200357469 Y1 | 7/2004 |
| WO | WO 2016094761 A2 | 6/2016 |

OTHER PUBLICATIONS

Office Action, dated Feb. 15, 2023, for Japanese Patent Application No. 2022-530340, 8 pages. (with English Translation).
Office Action, dated Nov. 17, 2023, for Chinese Patent Application No. 201910657081.5, with English translation. (10 pages).
Decision to Grant a Patent, dated Dec. 1, 2023, for Japanese Patent Application No. 2022-530340, with English translation. (5 pages).

* cited by examiner

TEST STICK, TESTING METHOD AND APPLICATION

The present application claims the right of priority for Chinese patent application No. 201910657081.5, filed with the China National Intellectual Property Administration on Jul. 19, 2019 and entitled "test stick, testing method and application", which is incorporated herein by reference in its entirety.

TECHNICAL FIELD

The present invention relates to a test stick, and in particular to a test stick for precise and simple in-vitro testing of a small amount of sample, and a testing method and application thereof.

BACKGROUND

Point-of-care testing (POCT) refers to a new method of performing clinical testing and bedside testing beside a patient to quickly obtain a testing result, which is usually not necessarily performed by a clinical technologist, but is to analyze immediately at a sampling location, thereby omitting complex processing procedures for specimens in laboratory testing.

Test sticks are commonly used tools in point-of-care testing for testing biochemical substances in blood, urine, feces and other body fluids, for example, bilirubin and biomarkers, such as protein, glucose, heme, ketone bodies, nitrite and urobilinogen, in serum, plasma and urine.

A test stick is composed of a stick shell (a top cover and a bottom cover) and a test strip in the stick shell. The test strip is fixed in a clamp slot in the bottom cover, and the top cover and the bottom cover are combined to form a test stick.

The current rapid testing technology generally requires a sample volume of at least 10 µL. However, in clinical practice, some samples, such as a tear fluid sample, can be obtained only 1 µL or less.

Regarding the existing rapid testing technology, in the case of a small amount of sample, such as 2 µL, if the sample is processed with additional steps, such as dilution, it will inevitably reduce the testing sensitivity, precision and accuracy, increase the complexity of the testing operation, have high requirements for tools, and have a greater probability of error.

The sensitivity of the existing rapid testing technology is generally 0.05 ng/mL (0.1 ng/mL for fluorescence immunoassay, and 0.05 ng/mL for quantum dot testing), and the precision is generally 5% to 15%. If calculated with the lower limit of testing of the total amount of the analyte of about 0.5 pg, the testing is difficult for a small amount of sample.

For eye diseases, due to the sensitivity and fragility of eye organs, the requirements for testing are relatively high. However, in actual operations, since the samples of tear fluid, aqueous humor and ocular surface lotion that can be collected from the eyes are all small amount of samples, the testing is difficult. For example, for patients with red and swollen eyes and conjunctival congestion, it is difficult for clinicians to determine whether the cause of disease is infection or allergy without the help of testing technology. Accurate and rapid diagnosis of the cause of disease is very important for guiding medication. If it is caused by allergy, anti-allergic drugs will be used. If it is caused by an infection, such as viral infection or amoebic infection, antiviral or corresponding anti-amebic infection treatment will be used. If anti-allergic drugs or even hormones are used on the infected eyes because of misdiagnosis, it may cause the patient's condition to become more serious and even cause serious medical accidents.

SUMMARY

In view of this, the present invention provides a test stick which, by means of a special design of a stick shell structure, controls the flow direction of a testing liquid on a test strip and the speed of chromatography to achieve the purpose of precise testing of small amount of samples in clinic so as to solve the problems existing in the prior art.

The present invention provides a test stick, comprising a top cover, a bottom cover and a test strip, the test strip being fixed by means of the top cover and the bottom cover, a clamp slot structure and a bulge stage are provided inside the bottom cover; the clamp slot structure is internally provided with a support bulge, with the height of the support bulge being less than or equal to the height of the bulge stage;

the top cover is provided with fixing plates, a reaction window, a sample loading hole and a testing liquid hole; the reaction window, the sample loading hole and the testing liquid hole are arranged in sequence; the fixing plates are distributed on two sides of the reaction window; and after the test strip is loaded in the clamp slot structure of the bottom cover and is fixed, the test strip is supported by the bulge stage and the support bulge, and after the top cover and the bottom cover are engaged by means of a positioning hole and a positioning post, under the pressing of the fixing plates and the testing liquid hole of the top cover, the middle of the test strip bulges upward.

Preferably, the test strip comprises a three-layer or four-layer structure, in which a first layer is a bottom plate, a second layer is a reaction membrane, and a third layer is an absorbent pad, a conjugate pad and a buffer pad; or a first layer is a bottom plate, a second layer is a reaction membrane and a buffer pad, and a third layer is a absorbent pad and a conjugate pad; or a first layer is a bottom plate, a second layer is a reaction membrane, a third layer is a absorbent pad and a conjugate pad, and a fourth layer is a buffer pad;

the reaction membrane is arranged in the middle of the bottom plate, a test line T and a control line C are distributed on the reaction membrane, and the test line T and the control line C correspond to the reaction window;

the conjugate pad is arranged at one end of the reaction membrane, the absorbent pad is arranged at the other end of the reaction membrane, and the conjugate pad corresponds to the sample loading hole; and the buffer pad is arranged on or under the conjugate pad, or the conjugate pad is butted with the buffer pad, and the buffer pad corresponds to the testing liquid hole.

Preferably, a number of the clamp slot structure is two and the two clamp slot structures are distributed on two sides of the bulge stage.

Preferably, the clamp slot structure is internally provided with 1-5 support bulges.

Preferably, the clamp slot structure is internally provided with 3 support bulges.

Preferably, flow guide ports are symmetrically arranged on two sides of the clamp slot structure corresponding to the testing liquid hole.

Preferably, the depth of the clamp slot structure is 1.2-1.7 mm, the height of the support bulge is 0.1-0.15 mm, and the height of the bulge stage is 0.15-0.25 mm.

Preferably, a number of the fixing plates is four, the fixing plates comprise a first fixing plate for fixing the test strip, a second fixing plate for fixing the test strip, a third fixing plate for fixing a combination of the absorbent pad and the reaction membrane on the test strip, and a fourth fixing plate for fixing a combination of the reaction membrane and the conjugate pad on the test strip; and the fourth fixing plate is arranged between the sample loading hole and the reaction window, and the first fixing plate, the second fixing plate and the third fixing plate are distributed on the other side of the reaction window.

Preferably, the first fixing plate, the second fixing plate, the third fixing plate and the fourth fixing plate have a width of 3-5 mm; and the first fixing plate and the second fixing plate have a height of 1.0-1.5 mm, and the third fixing plate and the fourth fixing plate have a height of 0.1-0.3 mm.

Preferably, the sample loading hole is of a funnel-shaped structure, the front-side circumferential diameter of the top cover is 4-6 mm, the inside circumferential diameter of the top cover is 3-5 mm, the height of the bulge is 0.1-0.2 mm, and an included angle between a hole wall and a horizontal plane is 30° to 45°.

Preferably, the testing liquid hole is of a funnel-shaped structure, the front-side circumferential diameter of the top cover is 6-8 mm, the inside circumferential diameter of the top cover is 1-3 mm, the height of the bulge is 0.3-0.5 mm, and the included angle between the hole wall and the horizontal plane is 30° to 45°.

Preferably, the reaction window is of an elliptical ring-shaped structure, the length of the front-side ellipse of the top cover is 15-20 mm and the width thereof is 7-9 mm, the inside circumferential diameter of the top cover 13-15 mm, the height of the bulge is 0.1-0.2 mm, the included angle between the hole wall and the horizontal plane is 30° to 45°, and a contact surface between the bottom of the reaction window and the test strip is a vertical bulge of 0.01-0.02 mm.

Preferably, the top cover comprises a hand-held end, with the surface of the hand-held end being of a threaded or embossed bulge structure.

Preferably, the top cover and the bottom cover are engaged by means of the positioning hole and the positioning post.

One or two or more test lines T are distributed on the reaction membrane.

In addition, the present application further provides a testing method using any test stick described above:

Step (1) Loading a Sample into a Sample Loading Hole after a sample is collected, the sample is loaded onto a conjugate pad in the sample loading hole, the conjugate pad being provided with antibodies coupled to nanospheres, i.e., antibody nanospheres, and analyte in the sample is immunologically bound with the antibody nanospheres on the conjugate pad to form antibody-nanosphere complexes; and Step (2) Loading a Testing Liquid into a Testing Liquid Hole after the testing liquid is loaded into the testing liquid hole, chromatography of the testing liquid is started in a direction of an absorbent pad end of the test strip, and the testing liquid under chromatography passes through the position of the sample loading hole to dissolve the antibody nanospheres on the conjugate pad that are not bound to the analyte and the antibody-nanosphere complexes that have been bound to the analyte; the chromatography of the testing liquid on the test strip undergoes "upslope, parallel and downslope"; and the testing liquid moves on the test strip and undergoes a second immune recognition reaction in the "parallel" stage, in which the antibody-nanosphere complexes in step (1) undergo the second immune recognition reaction at the test line T and begin to develop color, while the antibody nanospheres that do not react with the test line T continue to move forward and bind to the control line C to develop color.

Preferably, 0.1-50 μl of the sample is loaded into the sample loading hole; and 0-150 μl of the testing liquid is loaded into the testing liquid hole.

Preferably, after the reaction of the test stick is completed, the concentration of the analyte in the sample is calculated by measuring signal values of the T line and the C line with an instrument or by comparing color depths of the T line and the C line with a color card.

Preferably, the testing method described above is used for testing of small amount of samples, such as tear fluid, wound exudate, tissue fluid, sweat, aqueous humor and ocular surface lotion, can also be used for testing of routine samples, such as blood (peripheral blood, serum, plasma), saliva and urine, and can also be used for testing of other non-clinical samples, for example, for testing in pets, animal husbandry, agriculture, fish, food, environmental protection, etc.

Since the height of the support bulge is less than or equal to the height of the bulge stage, after the test strip is loaded in the clamp slots and is fixed, the test strip is supported by the support bulges in the clamp slots at two ends to form a "bridge" structure. In the process of the top cover and the bottom cover being engaged by means of the positioning hole and the positioning post, the fixing plates, the sample loading hole and the testing liquid hole on the top cover cooperate with the bulge stage to press downward, such that the middle portion of the reaction membrane bulges upward to form an "arch-bridge" structure with the horizontal plane. With such an "arch-bridge" structure, the flow direction of a testing liquid on the test strip and the speed of chromatography are controlled so as to improve the accuracy and precision of the testing result of the test stick to achieve the purpose of accurately testing a small amount of sample in clinic, which fills up a gap in the market of existing POCT testing products for small amount of samples.

BRIEF DESCRIPTION OF THE DRAWINGS

To describe technical solutions in embodiments of the present invention or in the prior art more clearly, the accompanying drawings required for describing the embodiments or the prior art will be briefly described below. Apparently, the accompanying drawings in the following description show merely embodiments of the present invention, and a person of ordinary skill in the art may still derive other accompanying drawings from the provided accompanying drawings without any creative effort.

In the FIGS.: 1. Bottom plate, 2. Buffer pad, 3. Conjugate pad, 4. Reaction membrane, 5. Test line T, 6. Control line C, 7. Absorbent pad, G01. Positioning post, G02. First fixing plate, G03. Second fixing plate, G04. Third fixing plate, G05. Reaction window, G06. Fourth fixing plate, A. Sample loading hole, B. Testing liquid hole, C. Hand-held end, D01. Positioning hole, D02. First clamp slot structure, D03. Support bulge, D04. Bulge stage, D05. Flow guide port, D06. Second clamp slot structure.

DETAILED DESCRIPTION OF EMBODIMENTS

Embodiments of the present invention provide a test stick to solve the problems exiting in the prior art.

The technical solutions in the embodiments of the present invention will be clearly and completely described below. Obviously, the described embodiments are some of, but not all the embodiments of the present invention. All other embodiments obtained by those of ordinary skill in the art based on the embodiments of the present invention without any creative effort shall fall within the scope of protection of the present invention.

In order to explain the present invention in more detail, a test stick provided by the present invention will be specifically described below in conjunction with the accompanying drawings.

See FIGS. 1-4, the present invention provides a test stick, comprising a top cover, a bottom cover and a test strip. The top cover and the bottom cover are engaged by means of positioning holes and positioning posts so as to fix the test strip. The top cover is provided with positioning posts G01, the bottom cover is provided with positioning holes D01, and the test strip is fixed by means of cooperation of the positioning posts G01 and the positioning holes D01. The positioning posts G01 are symmetrically distributed in three groups in position, including a front, a middle and a rear group, and the positioning posts G01 have a height of 2.5-3.5 mm and a diameter of 1.0-1.5 mm, and mainly support and fix the test stick. The positioning holes D01 are symmetrically distributed in three groups in position, including a front, a middle and a rear group, and post holes have a height of 2.5-3.5 mm and a diameter of 1.1-1.6 mm, and cooperate with the posts of the top cover to support and fix the test stick.

Figure 6A:
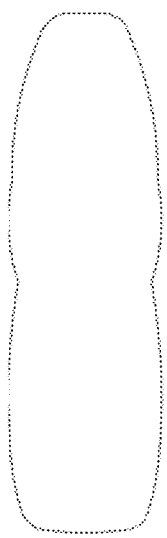
FIG. 6a is a schematic front view of the bottom cover.
Figure 6B:
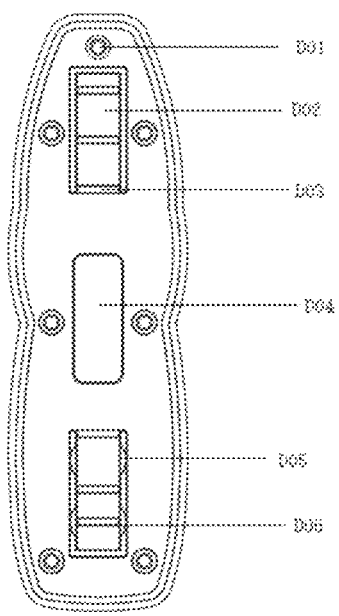
FIG. 6b is a schematic reverse view of the bottom cover.
Figure 6C:
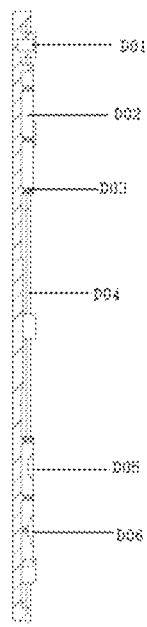
FIG. 6c is a schematic cross-sectional view of the bottom cover.
Figure 7A:
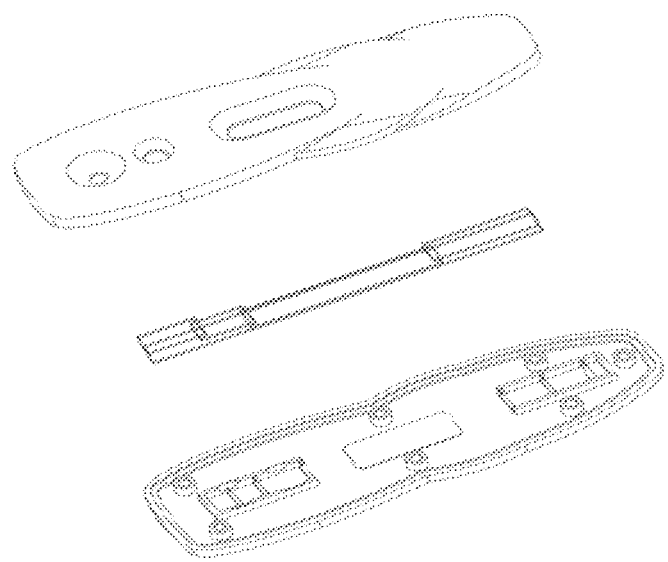
FIG. 7a is a schematic exploded view of the test stick.
Figure 7B:
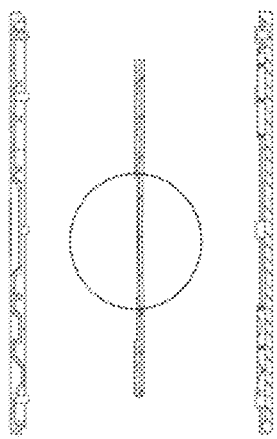
FIG. 7*b* is a schematic cross-sectional view of the test stick.

As shown in FIGS. 6A-6C, clamp slot structures (D02, D06) and a bulge stage D04 are provided inside the bottom cover. The clamp slot structure is internally provided with a support bulge D03, with the height of the support bulge D03 being less than or equal to the height of the bulge stage D04.

Figure 5A:
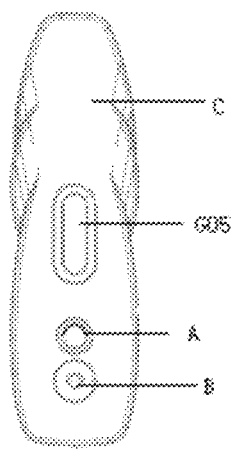
FIG. 5a is a schematic front view of the top cover.
Figure 5B:
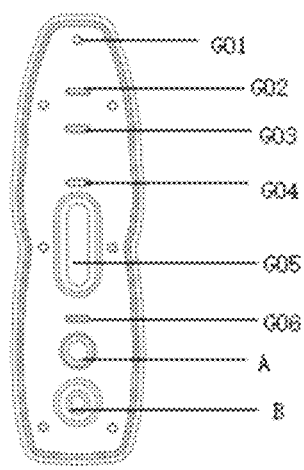
FIG. 5b is a schematic reverse view of the top cover.
Figure 5C:
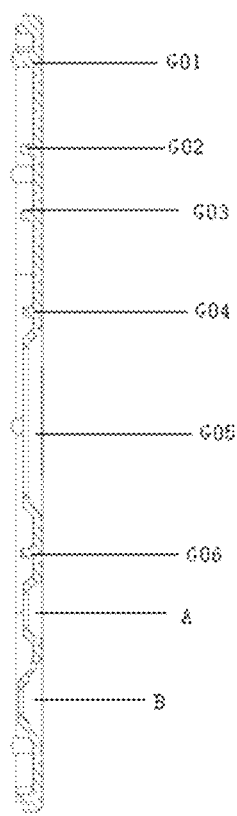
FIG. 5c is a schematic cross-sectional view of the top cover.

As shown in FIGS. 5A-5C, the top cover is provided with fixing plates (G02, G03, G04, G06), a reaction window G05, a sample loading hole A and a testing liquid hole B. The reaction window G05, the sample loading hole A and the testing liquid hole B are arranged in sequence. The fixing plates (G02, G03, G04, G06) are distributed on two sides of the reaction window G05.

After the test strip is loaded in the clamp slot structures (D02, D06) of the bottom cover and is fixed, the test strip is supported by the bulge stage D04 and the support bulge D03, and after the top cover and the bottom cover are engaged by means of the positioning holes and the positioning posts, under the pressing of the fixing plates (G02, G03, G04, G06) and the testing liquid hole B of the top cover, the middle of the test strip bulges upward.

Figure 1:
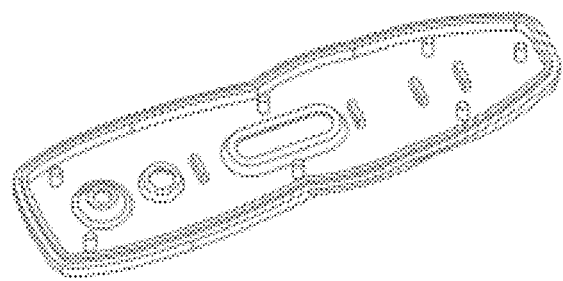
FIG. 1 is a schematic view of a top cover.
Figure 2:
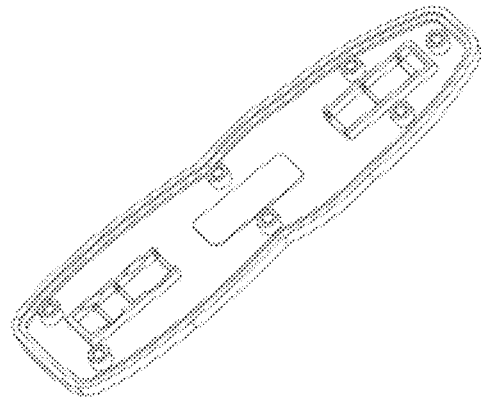
FIG. 2 is a schematic view of a bottom cover.
Figure 3A:
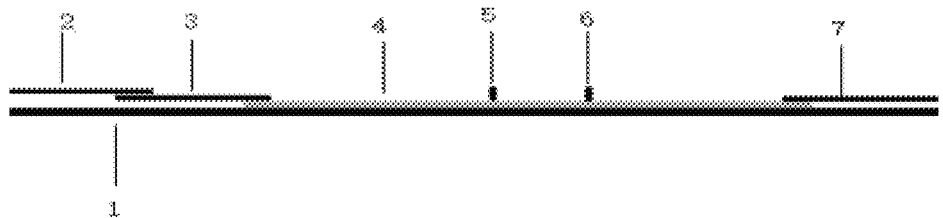
FIG. 3a is a schematic view of example 1 of a test strip.
Figure 3B:
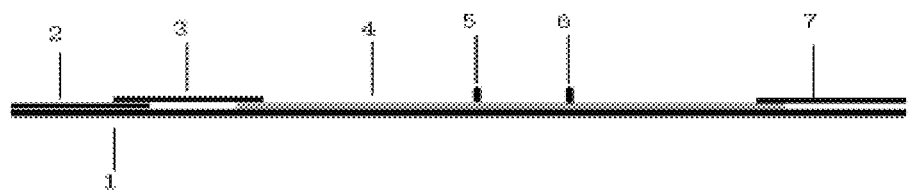
FIG. 3b is a schematic view of example 2 of a test strip.
Figure 3C:
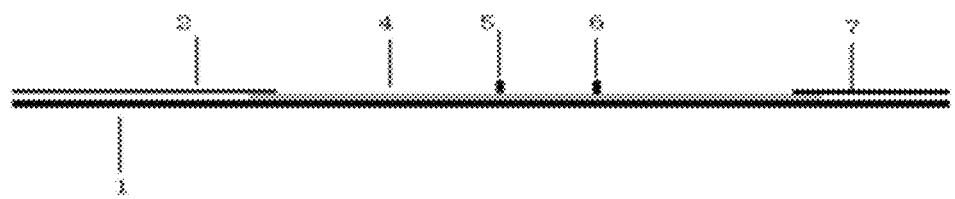
FIG. 3c is a schematic view of example 3 of a test strip.
Figure 4:
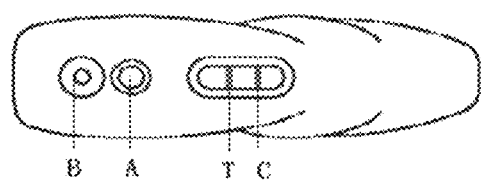
FIG. 4 is a schematic view of a test stick.

As shown in FIG. 3, the test strip comprises a three-layer or four-layer structure, in which a first layer is a bottom plate 1, with the material thereof being preferably PVC, a second layer is a reaction membrane 4, and a third layer is an absorbent pad 7, a conjugate pad 3 and a buffer pad 2; or the first layer is the bottom plate 1, the second layer is the reaction membrane 4, the third layer is the absorbent pad 7 and the conjugate pad 3, and the fourth layer is the buffer pad 2.

The reaction membrane 4 is arranged in the middle of the bottom plate 1, a test line T5 and a control line C6 are distributed on the reaction membrane 4, and the test line T5 and the control line C6 correspond to the reaction window G05. There may be two test lines T5 for distinguishing between two diseases.

The conjugate pad 3 is arranged at one end of the reaction membrane 4, the absorbent pad 7 is arranged at the other end of the reaction membrane 4, and the conjugate pad 3 corresponds to the sample loading hole A.

The buffer pad 2 is arranged on the conjugate pad 3, or the conjugate pad 3 is butted with the buffer pad 2, and the buffer pad 2 corresponds to the testing liquid hole B.

Two clamp slot structures are provided and are respectively a first clamp slot structure D02 and a second clamp slot structure D06, and the first clamp slot structure D02 and the second clamp slot structure D06 are distributed on two sides of the bulge stage D04.

The clamp slot structure is internally provided with 1-5 support bulges. Preferably, the clamp slot structure is internally provided with 3 support bulges, as shown in FIGS. 6A-6C, the first clamp slot structure D02 and the second clamp slot structure D06 are each internally provided with three support bulges D03.

Flow guide ports D05 are symmetrically arranged on two sides of the second clamp slot structure D06 corresponding to the testing liquid hole B. The two groups of flow guide ports D05 are symmetrically arranged at two ends of the clamp slot, which ensures that the testing liquid undergoes chromatography along the test strip so as to prevent the liquid from sticking to the stick shell or seeping to the back of the test strip due to the surface tension of the test stick.

The first clamp slot structure D02 and the second clamp slot structure D06 have a width of 3-5 mm, a length of 10-18 mm, and a depth of 1.2-1.7 mm, the support bulge D03 has a height of 0.1-0.15 mm and a width of 3-5 mm, and the bulge stage D04 has a height of 0.15-0.25 mm. The support bulges D03 are similar to the working principle of bridge piers, are distributed at both ends of the clamp slot and provided as three at the absorbent pad end, and act to fix and support the test strip.

Four fixing plates are provided, including a first fixing plate G02 for fixing the test strip, a second fixing plate G03 for fixing the test strip, a third fixing plate G04 for fixing a combination of the absorbent pad and the reaction membrane on the test strip, and a fourth fixing plate G06 for fixing a combination of the reaction membrane and the conjugate pad on the test strip. The fourth fixing plate G06 is arranged between the sample loading hole and the reaction window, and the first fixing plate G02, the second fixing plate G03 and the third fixing plate G04 are distributed on the other side of the reaction window G05.

The first fixing plate G02, the second fixing plate G03, the third fixing plate G04 and the fourth fixing plate G06 have a width of 3-5 mm. The first fixing plate G02 and the second fixing plate G03 have a height of 1.0-1.5 mm, and the third fixing plate G04 and the fourth fixing plate G06 have a height of 0.1-0.3 mm.

The first fixing plate G02 and the second fixing plate G03 are used to fix the test strip after the assembly of the stick shell, which is different from the test strips of other manufacturers which are fixed with tapes. The third fixing plate G04 has a main function to fix a combination of the absorbent pad 7 and the reaction membrane 4 on the test strip, which ensures that there is traction force for the liquid to continue chromatography and movement in the later stage of immunochromatography. The fourth fixing plate G06 has a main function to fix a combination of the conjugate pad 3 and the reaction membrane 4 on the test strip, such that the reactant of the first step and the solution reach the reaction membrane 4 smoothly to carry out the reaction of the second step.

The sample loading hole A is of a funnel-shaped structure, the front-side circumferential diameter of the top cover is 4-6 mm, the inside circumferential diameter of the top cover is 3-5 mm, the height of the bulge is 0.1-0.2 mm, and an included angle between a hole wall and a horizontal plane is 30° to 45°. The wide-mouth design is conducive to contact with the conjugate pad 3 of the test strip when a small amount of sample is loaded, and is also convenient for a variety of instruments to load a sample after the sample is collected, so as to enable the sample to be fully absorbed by the conjugate pad.

The testing liquid hole B is of a funnel-shaped structure, the front-side circumferential diameter of the top cover is 6-8 mm, the inside circumferential diameter of the top cover is 1-3 mm, the height of the bulge is 0.3-0.5 mm, and the included angle between the hole wall and the horizontal plane is 30° to 45°. With the funnel-shaped design, the liquid is stored after the testing liquid is loaded, and a hydraulic pressure is formed to drive the liquid to move toward the conjugate pad 3 and the reaction membrane 4. The bulge having a height of 0.3-0.5 mm is combined with the bottom cover and then tightly presses the buffer pad 2 at the clamp slot position, with the volume of about 90 μL, and releases the liquid directionally and slowly under a capillary action, so as to prevent the insufficient first-step immune reaction due to too fast liquid flow rate.

The reaction window G05 is of an elliptical ring-shaped structure, the length of the front-side ellipse of the top cover is 15-20 mm and the width thereof is 7-9 mm, the inside circumferential diameter of the top cover is 13-15 mm, the height of the bulge is 0.1-0.2 mm, the included angle between the hole wall and the horizontal plane is 30° to 45°, and a contact surface between the bottom of the reaction window and the test strip is a vertical bulge of 0.01-0.02 mm. The design of the vertical bulge of 0.01-0.02 mm prevents the liquid from being affected by an edge effect of an inward bulge during chromatographic movement of the liquid on the reaction membrane 4. Also, the bulge has a height of 0.1-0.2 mm, which is the same as the height of the sample loading hole A, both being 0.3-0.5 mm lower than the testing liquid B, so as to ensure the air circulation inside the test stick, so that the liquid chromatography process is not affected by the air pressure. The reaction window G05 is a position where the second step of the immune reaction is carried out. After the reaction, the concentration of the analyte in the sample can be calculated by measuring signal values of the T line and the C line with an instrument or by comparing color depths of the T line and the C line with a color card.

The top cover comprises a hand-held end C, with the surface of the hand-held end C being of a threaded or embossed bulge structure.

Figure 8A:
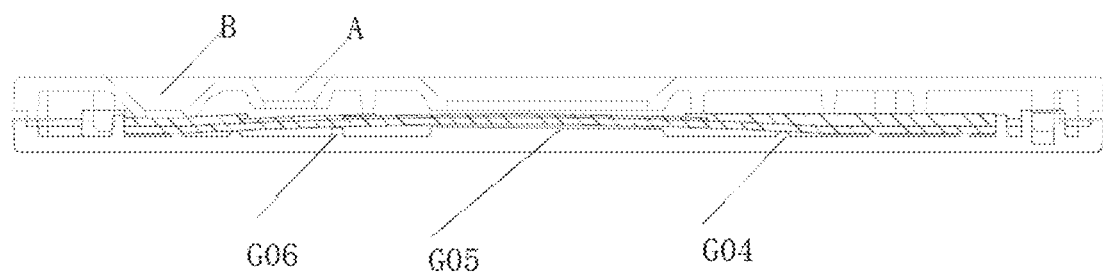
FIG. 8*a* is a schematic cross-sectional view of the test stick after assembly.
Figure 8B:
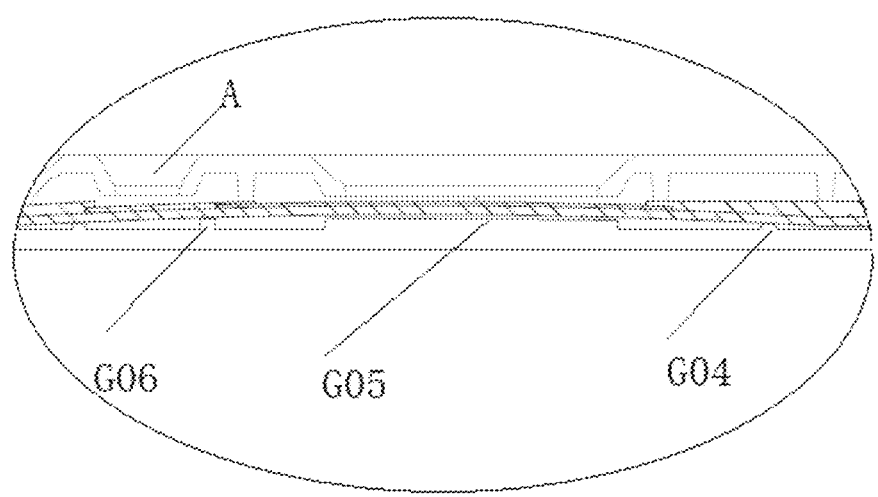
FIG. 8*b* is a partial enlarged cross-sectional view of the test stick after assembly.

The bulge stage D04 has a length of 15.0-0.0 mm, a width of 3.0-5.0 mm, and a height of 0.15-0.25 mm. This bulge stage D04 is located at the reaction window of the top cover, and is a position where the second step of the immune binding reaction is carried out. Since the height of the support bulge D03 is less than or equal to the height of the bulge stage D04, after the test strip is loaded in the clamp slots and is fixed, the test strip is supported by the support bulges D03 in the clamp slots at two ends to form a "bridge" structure. In the process of the top cover and the bottom cover being engaged by means of the positioning holes and the positioning posts, the fixing plates (G02, G03, G04, G06), the sample loading hole A and the testing liquid hole B on the top cover cooperate with the bulge stage D04 to press downward, such that the horizontal plane of the reaction membrane 4 in the middle of the test strip is raised, and the reaction membrane 4 in the middle bulges upward by 0.15-0.25 mm and forms an "arch-bridge" structure with the horizontal plane (see FIG. 8b). The formation of this "arch-bridge" structure plays an important role in the accuracy and precision of the testing result of the test stick. This design has the following two effects: I. control of the speed of chromatography to further expand the role of molecular sieve of the reaction membrane: in the chromatography process of the liquid, the horizontal plane of the test strip gradually rises. The liquid is in an upslope state during chromatography, and at this time, the speed of chromatography is decreased to prolong the time of the second step of reaction, such that the analyte that is not fully bound in the first step is further recognized and bound in the process of movement so as to, in the case of decreasing the speed of chromatography, further exert the role of molecular sieve of the reaction membrane to separate non-targets from some samples; and after the second step of sufficient reaction, the liquid begins to be in a downslope state, and under the action of the absorbent pad, the speed of chromatography is increased, the entire reaction process is completed within 10-15 min, and the speed of chromatography of liquid of the test stick is about 45 mm/s. II. unity of flow direction of liquid: the reagent strip forms an "arch-bridge" structure (see FIG. 8b), and the liquid performs chromatographic movement in the same direction under the capillary action so as to prevent the loss of analyte due to the liquid spreading around caused by hydraulic pressure when the testing liquid is dripped, which ensures the effective testing concentration of the small amount of sample liquid.

In addition, the present application further provides a testing method using any test stick described above:

Step (1) Loading a Sample into a Sample Loading Hole after a sample is collected, the sample is loaded onto a conjugate pad in the sample loading hole, the conjugate pad being provided with antibodies coupled to nanospheres, i.e., antibody nanospheres, and analyte in the sample is immunologically bound with the antibody nanospheres on the conjugate pad to form antibody-nanosphere complexes; and Step (2) Loading a Testing Liquid into a Testing Liquid Hole after the testing liquid is loaded into the testing liquid hole, chromatography of the testing liquid is started in a direction of an absorbent pad end of the test strip, and the testing liquid under chromatography passes through the position of the sample loading hole to dissolve the antibody nanospheres on the conjugate pad that are not bound to the analyte and the antibody-nanosphere complexes that have been bound to the analyte; the chromatography of the testing liquid on the test strip undergoes "upslope, parallel and downslope" (see FIG. 8b); and the testing liquid moves on the test strip and undergoes a second immune recognition reaction in the "parallel" stage, in which the antibody-nanosphere complexes in step (1) undergo the second immune recognition reaction at the test line T and begin to develop color, while the antibody nanospheres that do not react with the test line T continue to move forward and bind to the control line C to develop color.

0.1-50 μl of the sample is loaded into the sample loading hole; and 0-150 μl of the testing liquid is loaded into the testing liquid hole.

After the reaction of the test stick is completed, the concentration of the analyte in the sample is calculated by measuring signal values of the T line and the C line with an instrument or by comparing color depths of the T line and the C line with a color card. Whether the color development of the C line is sufficient is an important indicator to evaluate whether the reaction of this test stick is complete and whether the measured value is accurate. The C line is a control line, which plays an important role in the interpretation of the testing result of the test stick. The C line needs to be fully developed and reach a predetermined value before the testing result is determined to be valid. If the C line is not developed, the measured value is low, there may be interference, and the testing result is invalid. If the C line is developed insufficiently, the measured value is low, indicating that the user may operate incorrectly and the testing result is invalid.

The testing method described above is used for testing of a tear fluid, wound exudate, tissue fluid, sweat, aqueous humor, and ocular surface lotion.

For the testing of a small amount of sample, improving the utilization rate of the sample, and allowing the analyte to be fully recognized by the corresponding antibody and undergo the immune binding reaction are the keys to ensure accurate and reliable testing results, which is mainly realized from the following four aspects in the design of this test stick.

(1) Sample Loading

The front side (the top cover) of the test stick is designed to have a sample loading hole A and a testing liquid hole B. When the sample volume is 1-5 μL, after a small amount of sample is collected, the sample is loaded to the conjugate pad in the sample loading hole A, then the testing liquid is dripped into the testing liquid hole B, and then the reaction of immunochromatography is started. The whole process is simple to operate.

The sample loading hole A is located at the conjugate pad of the test strip. The conjugate pad is made of hydrophilic glass cellulose, and the conjugate pad is provided with nanoparticle-labeled antibody AB-1. The sample is directly loaded to the conjugate pad, and the hydrophilic material is conducive to the diffusion of the sample, so that the analyte in the sample is recognized and immunologically bound with the nanoparticle-labeled antibody AB-1. The utilization rate of the sample is almost 100%, and a small amount of liquid of 0.1-5 μL will not cause the subsequent chromatography reaction. Alternatively, a larger volume of sample, ≥50 μL, can be loaded directly for testing.

(2) A First Step of Immune Reaction

After the sample is loaded into the sample loading hole A, the analyte binds to the nanosphere-labeled antibody AB-1 to form the bottom and middle layers of a "sandwich" structure of the double antibody sandwich method, so as to complete the first step of immunochromatography testing.

(3) Control of Flow Direction and Flow Rate of Liquid During Immunochromatography After the testing liquid is loaded into the testing liquid hole B, the testing liquid begins chromatography in a direction of the absorbent pad end of the test strip. From the beginning to the completion of the reaction, the chromatography of the liquid on the test strip undergoes "upslope, parallel and downslope" (see FIG. 8b), and the control of the flow direction and flow rate of the liquid depends on the special design of the test stick.

(4) A Second Step of Immune Reaction

The liquid moves on the test strip and performs the second immune recognition reaction in the "parallel" stage, so as to form a complete "sandwich" structure with the test line T and begin to develop color, with the depth of the color being positively correlated with the content of the analyte, i.e., the "sandwich" middle layer. The nanoparticles that do not react with the T line continue to move forward, and are bound to the control line C to develop color. After the reaction of the test stick is completed, the concentration of the analyte in the sample can be calculated by measuring signal values of the T line and the C line with an instrument or by comparing color depths of the T line and the C line with a color card. Whether the color development of the C line is sufficient is an important indicator to evaluate whether the reaction of this test stick is complete and whether the measured value is accurate.

By means of the special design of the stick shell, the flow direction of a testing liquid on the test strip and the speed of chromatography are controlled to achieve the purpose of accurately testing a small amount of sample in clinic, which fills up a gap in the market of existing POCT testing products for small amount of samples.

Example 1 of the Testing Method

The test stick provided in the present application can be used for the auxiliary diagnosis of dry eye:

Step (1) Loading a Sample into a Sample Loading Hole after a tear fluid sample is collected, 1 μL of the tear fluid sample is loaded onto a conjugate pad in the sample loading hole, the conjugate pad being provided with a-lymphotoxin (LTA) antibodies coupled to nanospheres, i.e., antibody nanospheres, and analyte in the sample is immunologically bound with the antibody nanospheres on the conjugate pad to form antibody-nanosphere complexes; and Step (2) Loading a Testing Liquid into a Testing Liquid Hole after an a-lymphotoxin (LTA) testing liquid is loaded into the testing liquid hole, chromatography of the testing liquid is started in a direction of an absorbent pad end of the test strip, and the testing liquid under chromatography passes through the position of the sample loading hole to dissolve the antibody nanospheres on the conjugate pad that are not bound to the analyte and the antibody-nanosphere complexes that have been bound to the analyte; the chromatography of the testing liquid on the test strip undergoes "upslope, parallel and downslope" (see FIG. 8b); and the testing liquid moves on the test strip and undergoes a second immune recognition reaction in the "parallel" stage, in which the antibody-nanosphere complexes in step (1) undergo the second immune recognition reaction at the test line T and begin to develop color, while the antibody nanospheres that do not react with the test line T continue to move forward and bind to the control line C to develop color.

After multiple tests, the sensitivity reached 0.15 ng/mL, and the precision CV reached 5% to 10%.

Example 2 of the Testing Method

The test stick provided in the present application can be used for the auxiliary diagnosis of inflammation:

Step (1) Loading a Sample into a Sample Loading Hole after an aqueous humor sample is collected, 0.5 μL of the aqueous humor sample is loaded onto a conjugate pad in the sample loading hole, the conjugate pad being provided with matrix metalloproteinase 9 (MMP-9) antibodies coupled to nanospheres, i.e., antibody nanospheres, and analyte in the sample is immunologically bound with the antibody nanospheres on the conjugate pad to form antibody-nanosphere complexes; and Step (2) Loading a Testing Liquid into a Testing Liquid Hole after a matrix metalloproteinase 9 (MMP-9) testing liquid is loaded into the testing liquid hole, chromatography of the testing liquid is started in a direction of an absorbent pad end of the test strip, and the testing liquid under chromatography passes through the position of the sample loading hole to dissolve the antibody nanospheres on the conjugate pad that are not bound to the analyte and the antibody-nanosphere complexes that have been bound to the analyte; the chromatography of the testing liquid on the test strip undergoes "upslope, parallel and downslope" (see FIG. 8b); and the testing liquid moves on the test strip and undergoes a second immune recognition reaction in the "parallel" stage, in which the antibody-nanosphere complexes in step (1) undergo the second immune recognition reaction at the test line T and begin to develop color, while the antibody nanospheres that do not react with the test line T continue to move forward and bind to the control line C to develop color. After multiple tests, the sensitivity reached 1.0 ng/mL, and the precision CV reached 5% to 10%.

Example 3 of the Testing Method

The test stick provided in the present application can be used for the auxiliary diagnosis of allergic conjunctivitis:

Step (1) Loading a Sample into a Sample Loading Hole after an ocular surface lotion sample is collected, 2.2 μL of the ocular surface lotion sample is loaded onto a conjugate pad in the sample loading hole, the conjugate pad being provided with total immunoglobulin E (IgE) antibodies coupled to nanospheres, i.e., antibody nanospheres, and analyte in the sample is immunologically bound with the antibody nanospheres on the conjugate pad to form antibody-nanosphere complexes; and Step (2) Loading a Testing Liquid into a Testing Liquid Hole after a total immunoglobulin E (IgE) testing liquid is loaded into the testing liquid hole, chromatography of the testing liquid is started in a direction of an absorbent pad end of the test strip, and the testing liquid under chromatography passes through the position of the sample loading hole to dissolve the antibody nanospheres on the conjugate pad that are not bound to the analyte and the antibody-nanosphere complexes that have been bound to the analyte; the chromatography of the testing liquid on the test strip undergoes "upslope, parallel and downslope" (see FIG. 8b); and the testing liquid moves on the test strip and undergoes a second immune recognition reaction in the "parallel" stage, in which the antibody-nanosphere complexes in step (1) undergo the second immune recognition reaction at the test line T and begin to develop color, while the antibody nanospheres that do not react with the test line T continue to move forward and bind to the control line C to develop color. After multiple tests, the sensitivity reached 0.5 IU/mL, and the precision CV reached 5% to 10%.

Example 4 of the Testing Method

The test stick provided in the present application can be used for the auxiliary diagnosis of conjunctivitis and the differential diagnosis of conjunctivitis caused by allergy or viral infection:

Step (1) Loading a Sample into a Sample Loading Hole after an ocular surface lotion sample is collected, 2.2 μL of the ocular surface lotion sample is loaded onto a conjugate pad in the sample loading hole, the conjugate pad being provided with total immunoglobulin E (IgE) antibodies and virus antibodies both coupled to nanospheres, i.e., antibody nanospheres, and analyte in the sample is immunologically bound with the antibody nanospheres on the conjugate pad to form antibody-nanosphere complexes; and Step (2) Loading a Testing Liquid into a Testing Liquid Hole after a total immunoglobulin E (IgE) and virus testing liquid is loaded into the testing liquid hole, chromatography of the testing liquid is started in a direction of an absorbent pad end of the test strip, and the testing liquid under chromatography passes through the position of the sample loading hole to dissolve the antibody nanospheres on the conjugate pad that are not bound to the analyte and the antibody-nanosphere complexes that have been bound to the analyte; the chromatography of the testing liquid on the test strip undergoes "upslope, parallel and downslope" (see FIG. 8b); and the testing liquid moves on the test strip and undergoes a second immune recognition reaction in the "parallel" stage, in which the antibody-nanosphere complexes in step (1) undergo the second immune recognition reaction at the two test lines T (respectively being a virus test line T and a total IgE test line T) and begin to develop color, and according to the color development of the virus test line T and the total IgE test line T, it is possible to determine whether the eye disease is caused by viral infection or allergy, while the antibody nanospheres that do not react with the test line T continue to move forward and bind to the control line C to develop color. After multiple tests, the sensitivity reached 0.5 IU/mL or 0.5 ng/mL, and the precision CV reached 5% to 10%.

The above descriptions are merely preferable implementations of the present invention. It should be noted that for those of ordinary skills in the art, some refinements and modification may be further made without departing from the principle of the present invention, and the refinements and modification shall fall within the scope of protection of the present invention.

What is claimed is:

1. A test stick, comprising a top cover, a bottom cover and a test strip, the test strip being fixed by means of the top cover and the bottom cover, wherein a positioning hole, a clamp slot structure and a bulge stage are provided inside the bottom cover; the clamp slot structure is internally provided with a support bulge, with a height of the support bulge being less than or equal to a height of the bulge stage;

the top cover is provided with fixing plates, a reaction window, a sample loading hole, a positioning post and a testing liquid hole; wherein the reaction window, the sample loading hole and the testing liquid hole are arranged in sequence; wherein the fixing plates are distributed on two sides of the reaction window; and the test strip is configured to be loaded in the clamp slot structure of the bottom cover and fixed thereto, the test strip is configured to be supported by the bulge stage and the support bulge, the top cover and the bottom cover are configured to be engaged by means of the positioning hole and the positioning post, and the middle of the test strip is configured to bulge upward under a pressure of the fixing plates and the testing liquid hole of the top cover towards the bottom cover.

2. The test stick according to claim 1, wherein the test strip comprises a three-layer or four-layer structure, in which a first layer is a bottom plate, a second layer is a reaction membrane, and a third layer is an absorbent pad, a conjugate pad and a buffer pad; or a first layer is a bottom plate, a second layer is a reaction membrane and a buffer pad, and a third layer is a absorbent pad and a conjugate pad; or a first layer is a bottom plate, a second layer is a reaction membrane, a third layer is a absorbent pad and a conjugate pad, and a fourth layer is a buffer pad;

the reaction membrane is arranged in the middle of the bottom plate, a test line T and a control line C are distributed on the reaction membrane, and the test line T and the control line C correspond to the reaction window;

the conjugate pad is arranged at one end of the reaction membrane, the absorbent pad is arranged at the other end of the reaction membrane, and the conjugate pad corresponds to the sample loading hole; and the buffer pad is arranged on or under the conjugate pad, or the conjugate pad is butted with the buffer pad, and the buffer pad corresponds to the testing liquid hole.

3. The test stick according to claim 2, wherein a number of the clamp slot structure is two, wherein the two clamp slot structures are distributed on two sides of the bulge stage, one of the clamp slot structures is corresponding to the testing liquid hole.

4. The test stick according to claim 3, wherein the clamp slot structure is internally provided with 1-5 support bulges.

5. The test stick according to claim 4, wherein the clamp slot structure is internally provided with 3 support bulges.

6. The test stick according to claim 5, wherein flow guide ports are symmetrically arranged on two sides of the clamp slot structure corresponding to the testing liquid hole.

7. The test stick according to claim 6, wherein a depth of the clamp slot structure is 1.2-1.7 mm, the height of the support bulge is 0.1-0.15 mm, and the height of the bulge stage is 0.15-0.25 mm.

8. The test stick according to claim 7, wherein a number of the fixing plates is four, wherein the fixing plates comprise a first fixing plate for fixing the test strip, a second fixing plate for fixing the test strip, a third fixing plate for fixing a combination of the absorbent pad and the reaction membrane on the test strip, and a fourth fixing plate for fixing a combination of the reaction membrane and the conjugate pad on the test strip; wherein the fourth fixing plate is arranged between the sample loading hole and the reaction window, and the first fixing plate, the second fixing plate and the third fixing plate are distributed on the other side of the reaction window.

9. The test stick according to claim 8, wherein the first fixing plate, the second fixing plate, the third fixing plate and the fourth fixing plate have a width of 3-5 mm; and the first fixing plate and the second fixing plate have a height of 1.0-1.5 mm, and the third fixing plate and the fourth fixing plate have a height of 0.1-0.3 mm.

10. The test stick according to claim 9, wherein the sample loading hole is of a funnel-shaped structure, a front-side circumferential diameter of the sample loading hole of the top cover is 4-6 mm, an inside circumferential diameter of the sample loading hole of the top cover is 3-5 mm, a height of a bulge of the sample loading hole is 0.1-0.2 mm, and an included angle between a hole wall and a horizontal plane of the top cover is 30° to 45°.

11. The test stick according to claim 10, wherein the testing liquid hole is of a funnel-shaped structure, a front-side circumferential diameter of the testing liquid hole of the top cover is 6-8 mm, an inside circumferential diameter of the testing liquid hole of the top cover is 1-3 mm, a height of a bulge of the testing liquid hole of is 0.3-0.5 mm, and an included angle between a hole wall and a horizontal plane of the top cover is 30° to 45°.

12. The test stick according to claim 11, wherein the top cover comprises a hand-held end, with a surface of the hand-held end being of a threaded or embossed bulge structure.

13. The test stick according to claim 12, wherein the top cover and the bottom cover are engaged by means of the positioning hole and the positioning post.

14. The test stick according to claim 11, wherein one or two or more test lines T are distributed on the reaction membrane.

15. A testing method implemented using the test stick of claim 1, the testing method comprising:

after the test strip is loaded in the clamp slot structure of the bottom cover and is fixed, the test strip is supported by the bulge stage and the support bulge, and after the top cover and the bottom cover are engaged by means of the positioning hole and the positioning post, under the pressure of the fixing plates and the testing liquid hole of the top cover, the middle of the test strip bulges upward, wherein, step (1) loading a sample into the sample loading hole;

after a sample is collected, the sample is loaded onto a conjugate pad in the sample loading hole, the conjugate pad being provided with antibody nanospheres, and analyte in the sample is immunologically bound with the antibody nanospheres on the conjugate pad to form antibody-nanosphere complexes; and step (2) loading a testing liquid into the testing liquid hole;

after the testing liquid is loaded into the testing liquid hole, chromatography of the testing liquid is started in a direction of an absorbent pad end of the test strip, and the testing liquid under chromatography passes through a position of the sample loading hole to dissolve the antibody nanospheres on the conjugate pad that are not bound to the analyte and the antibody-nanosphere complexes that have been bound to the analyte; the chromatography of the testing liquid on the test strip undergoes upslope stage, parallel stage and downslope stage; and the testing liquid moves on the test strip and undergoes a second immune recognition reaction in the parallel stage, in which the antibody-nanosphere complexes in step (1) undergo the second immune recognition reaction at a test line T distributed on the test strip and begin to develop color, while the antibody nanospheres that do not react with the test line T continue to move forward and bind to a control line C distributed on the test strip to develop color.

16. The testing method according to claim 15, wherein 0.1-50 μl of the sample is loaded into the sample loading hole; and 0-150 μl of the testing liquid is loaded into the testing liquid hole.

17. The testing method according to claim 16, wherein after the second immune recognition reaction of the test stick is completed, a concentration of the analyte in the sample is calculated by measuring signal values of the T line and the C line with an instrument or by comparing color depths of the T line and the C line with a color card.

18. The testing method of claim 15 wherein the sample is a sample of tear fluid, wound exudate, tissue fluid, sweat, aqueous humor, or ocular surface lotion.

* * * * *